(12) United States Patent
Luo et al.

(10) Patent No.: US 7,457,330 B2
(45) Date of Patent: Nov. 25, 2008

(54) LOW SPECKLE NOISE MONOLITHIC MICROCHIP RGB LASERS

(75) Inventors: Ningyi Luo, Fremont, CA (US); Sheng-Bai Zhu, Fremont, CA (US)

(73) Assignee: Pavilion Integration Corporation, San Jose, CA (US)

( * ) Notice: Subject to any disclaimer, the term of this patent is extended or adjusted under 35 U.S.C. 154(b) by 154 days.

(21) Appl. No.: 11/424,471

(22) Filed: Jun. 15, 2006

(65) Prior Publication Data

US 2007/0291810 A1    Dec. 20, 2007

(51) Int. Cl.
*H01S 3/108* (2006.01)
(52) U.S. Cl. .......................................... 372/22; 372/21
(58) Field of Classification Search ................... 372/21, 372/22
See application file for complete search history.

(56) References Cited

U.S. PATENT DOCUMENTS

| | | | |
|---|---|---|---|
| 3,490,827 A | 1/1970 | Van Ligten et al. | |
| 3,588,217 A | 6/1971 | Mathisen | |
| 4,035,068 A | 7/1977 | Rawson | |
| 4,155,630 A | 5/1979 | Ih | |
| 4,511,220 A | 4/1985 | Scully | |
| 5,224,200 A | 6/1993 | Rasmussen et al. | |
| 5,233,460 A | 8/1993 | Partlo et al. | |
| 5,272,473 A | 12/1993 | Thompson et al. | |
| 5,274,494 A | 12/1993 | Rafanelli et al. | |
| 5,313,479 A | 5/1994 | Florence | |
| 5,621,529 A | 4/1997 | Gordon et al. | |
| 5,704,700 A * | 1/1998 | Kappel et al. | .................. 353/31 |
| 5,729,374 A | 3/1998 | Tiszauer et al. | |
| 5,751,751 A * | 5/1998 | Hargis et al. | .................. 372/41 |
| 5,828,424 A | 10/1998 | Wallenstein | |
| 5,832,010 A * | 11/1998 | Fulbert et al. | .................. 372/22 |
| 6,005,722 A | 12/1999 | Butterworth et al. | |
| 6,081,381 A | 6/2000 | Shalapenok et al. | |
| 6,169,634 B1 | 1/2001 | Sirat | |
| 6,191,887 B1 | 2/2001 | Michaloski et al. | |
| 6,233,025 B1 | 5/2001 | Wallenstein | |
| 6,304,237 B1 | 10/2001 | Karakawa | |
| 6,323,984 B1 | 11/2001 | Trisnadi | |

(Continued)

FOREIGN PATENT DOCUMENTS

DE    19610371 A1 *  9/1997

OTHER PUBLICATIONS

Goodman in "Some fundamental properties of speckle," J. Opt. Soc. A., vol. 66, No. 11, Nov. 1976, pp. 1145-1150.

(Continued)

*Primary Examiner*—Minsun Harvey
*Assistant Examiner*—Michael Carter

(57) ABSTRACT

A method for reducing speckle noise of a monolithic microchip laser with intracavity beam combining and sum frequency mixing is based on time averaging of uncorrelated speckle patterns generated from a large number of independent longitudinal modes and comprises schemes including selection of gain media and nonlinear optical materials to support broadband sum frequency mixing; adoption of gain-conjugated and/or chirped mirrors for flat-top spectra and/or mode phase diversification; multimode laser operation introduced by RF modulation; and multiplication of source modes in frequency mixing process featured with degeneration free and narrowed/uneven intervals. A device and an apparatus for generating low speckle noise red, green, blue lasers adaptable for color display systems are developed based on the inventive method.

8 Claims, 9 Drawing Sheets

101

U.S. PATENT DOCUMENTS

| | | | |
|---|---|---|---|
| 6,362,919 B1 * | 3/2002 | Flanders | 359/497 |
| 6,445,487 B1 | 9/2002 | Roddy et al. | |
| 6,470,122 B1 | 10/2002 | Doumuki | |
| 6,483,556 B1 | 11/2002 | Karakawa et al. | |
| 6,577,429 B1 | 6/2003 | Kurtz et al. | |
| 6,594,090 B2 | 7/2003 | Kruschwitz et al. | |
| 6,600,590 B2 | 7/2003 | Roddy et al. | |
| 6,625,381 B2 | 9/2003 | Roddy et al. | |
| 6,693,930 B1 | 2/2004 | Chuang et al. | |
| 6,738,105 B1 | 5/2004 | Hannah et al. | |
| 6,747,781 B2 | 6/2004 | Trisnadi | |
| 6,774,881 B2 | 8/2004 | Karakawa | |
| 6,816,519 B2 * | 11/2004 | Momiuchi et al. | 372/21 |
| 6,830,189 B2 | 12/2004 | Tsikos et al. | |
| 6,857,570 B2 | 2/2005 | Tsikos et al. | |
| 6,863,216 B2 | 3/2005 | Tsikos et al. | |
| 6,895,149 B1 | 5/2005 | Jacob et al. | |
| 6,898,216 B1 | 5/2005 | Kleinschmidt | |
| 6,952,435 B2 | 10/2005 | Lai et al. | |
| 6,956,878 B1 | 10/2005 | Trisnadi | |
| 6,969,001 B2 | 11/2005 | Tsikos et al. | |
| 6,971,576 B2 | 12/2005 | Tsikos et al. | |
| 6,975,294 B2 | 12/2005 | Manni et al. | |
| 6,997,386 B2 | 2/2006 | Tsikos et al. | |
| 7,028,899 B2 | 4/2006 | Tsikos et al. | |
| 7,030,383 B2 | 4/2006 | Babayoff et al. | |
| 7,046,446 B1 | 5/2006 | Kowarz et al. | |
| 2002/0018036 A1 | 2/2002 | Karakawa | |
| 2004/0008399 A1 | 1/2004 | Trisnadi | |
| 2005/0008290 A1 | 1/2005 | Miron | |
| 2005/0226285 A1 * | 10/2005 | Sakata et al. | 372/22 |

OTHER PUBLICATIONS

Wang et al. in "Speckle reduction in laser projection systems by diffractive optical elements," Applied Optics, vol. 37, No. 10, Apr. 1998, pp. 1770-1775.

* cited by examiner

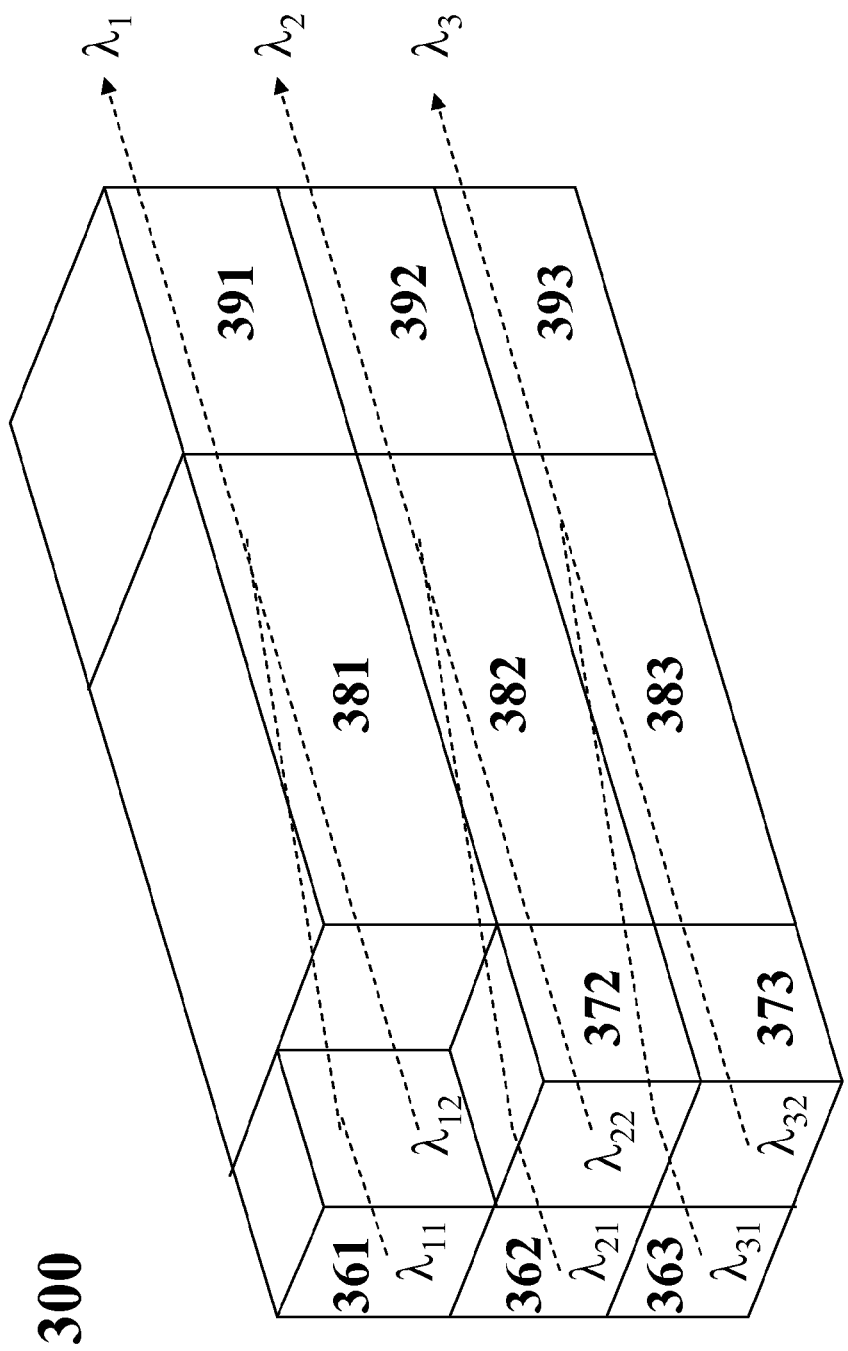

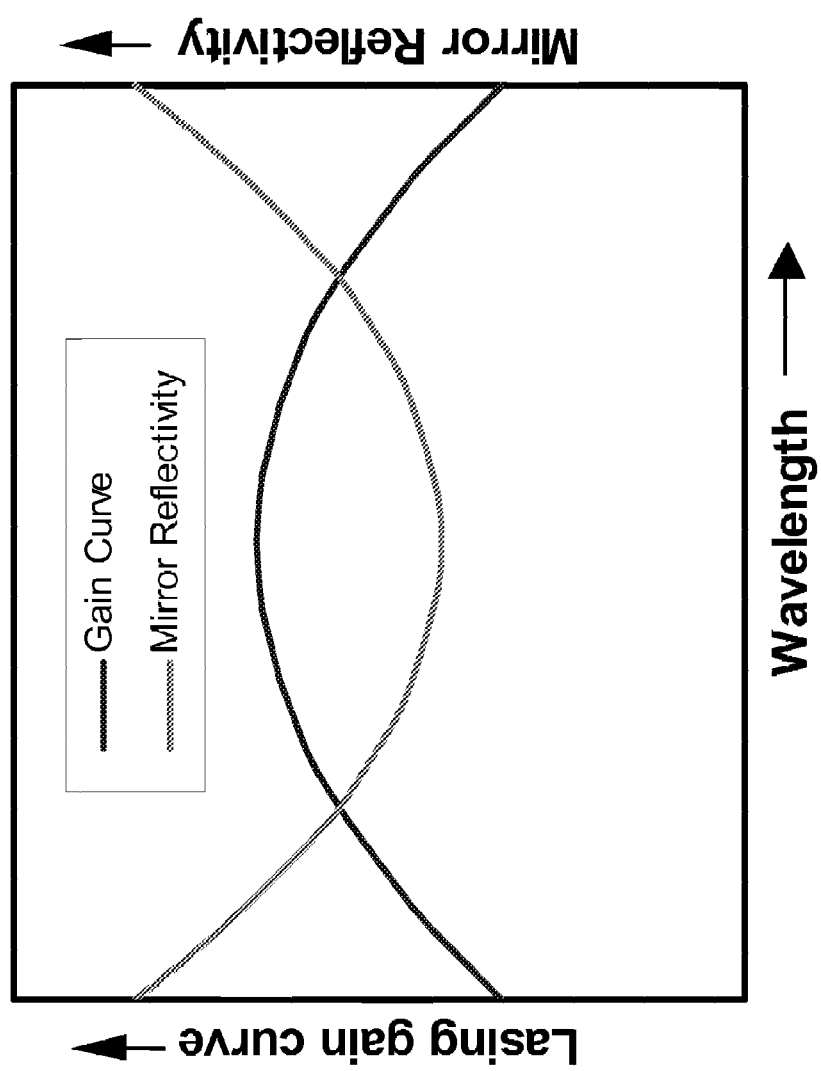

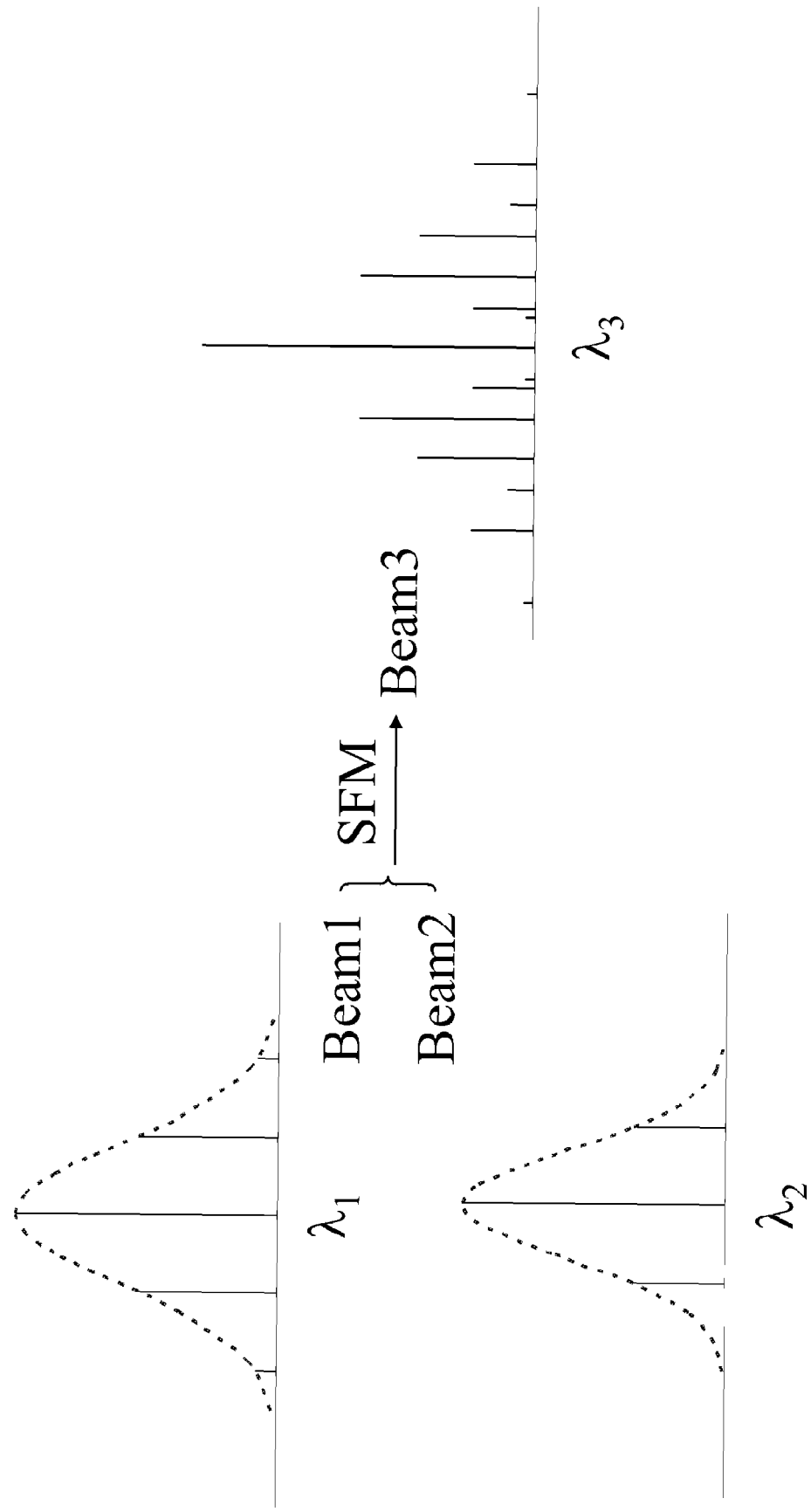

FIG 6B $$\Delta\lambda_e \text{ pm} \otimes \Delta\lambda_o \text{ pm} \begin{pmatrix} -80.920 \\ -64.736 \\ -48.552 \\ -32.368 \\ -16.184 \\ 0.000 \\ 16.184 \\ 32.368 \\ 48.552 \\ 64.736 \\ 80.920 \end{pmatrix} = \Delta\lambda_{mix} \text{ pm}$$

| | -82.390 | -65.912 | -49.434 | -32.956 | -16.478 | 0.000 | 16.478 | 32.956 | 49.434 | 65.912 | 82.390 |
|---|---|---|---|---|---|---|---|---|---|---|---|
| | -40.828 | -36.708 | -32.589 | -28.469 | -24.350 | -20.231 | -16.112 | 11.993 | -7.874 | -3.755 | 0.364 |
| | -36.782 | -32.662 | -28.543 | -24.423 | -20.304 | -16.185 | -12.065 | -7.946 | -3.827 | 0.292 | 4.411 |
| | -32.736 | -28.616 | -24.497 | -20.377 | -16.258 | -12.138 | -8.019 | -3.900 | 0.219 | 4.338 | 8.457 |
| | -28.690 | -24.570 | -20.451 | -16.331 | -12.212 | -8.092 | -3.973 | 0.146 | 4.266 | 8.385 | 12.504 |
| | -24.644 | -20.524 | -16.405 | -12.285 | -8.166 | -4.046 | 0.073 | 4.193 | 8.312 | 12.431 | 16.550 |
| | -20.598 | -16.478 | -12.359 | -8.239 | -4.120 | 0.000 | 4.119 | 8.239 | 12.358 | 16.477 | 20.597 |
| | -16.553 | -12.433 | -8.313 | -4.193 | -0.074 | 4.046 | 8.166 | 12.285 | 16.404 | 20.524 | 24.643 |
| | -12.507 | -8.387 | -4.267 | -0.147 | 3.972 | 8.092 | 12.211 | 16.331 | 20.450 | 24.570 | 28.689 |
| | -8.461 | -4.341 | -0.222 | 3.898 | 8.018 | 12.138 | 16.257 | 20.377 | 24.497 | 28.616 | 32.735 |
| | -4.416 | -0.296 | 3.824 | 7.944 | 12.064 | 16.184 | 20.303 | 24.423 | 28.543 | 32.662 | 36.781 |
| | -0.370 | 3.750 | 7.870 | 11.990 | 16.109 | 20.229 | 24.349 | 28.469 | 32.588 | 36.708 | 40.828 |

LOW SPECKLE NOISE MONOLITHIC MICROCHIP RGB LASERS

FIELD OF THE INVENTION

This invention relates generally to solid-state lasers, and in particular to monolithic microchip lasers using intracavity beam combining and sum frequency mixing (SFM) to generate low speckle noise red (R), green (G), blue (B) lights adaptable for image display systems.

In U.S. patent application Ser. No. 11/378552, entitled as "Monolithic Microchip Laser with Intracavity Beam Combining and Sum Frequency or Difference Frequency Mixing", Luo, Zhu, and Lu have disclosed a low-noise monolithic microchip laser, wherein intracavity beam combining and sum frequency mixing or difference frequency mixing (DFM) are used for generation of various lasing wavelengths. According to their invention, two fundamental laser beams are generated from two independent laser oscillator cavities. These two fundamental laser beams are then combined based on the walk-off effect in a birefringent crystal and generate the desired wavelength by means of intracavity SFM or DFM in a nonlinear optical (NLO) crystal. With this scheme, the green problem is eliminated. By incorporation of spectral broadening and multimode operation into this innovation, low speckle noise laser output is achievable. This is the main object of the present invention

BACKGROUND OF THE INVENTION

Speckle is a serious problem associated with laser display systems. Speckle noise is an interference pattern resulting from reflection or transmission of highly coherent (both spatial and temporal) light from optically rough surfaces (RMS surface height deviations on the same order or scale as the wavelength of the light beams) such as display screens. Speckle noise can be reduced by superimposing a number of uncorrelated speckle patterns, obtained by diversity of time, space, frequency or polarization of light as taught by Goodman.

Past efforts of reducing speckle noise are numerous. Many of the conventional speckle reduction approaches are based on disturbance of temporal coherence of laser beams such as wavelength (frequency) diversity achieved from multiple lasers associated with beam combiner, broadband lasers, or pulse lasers especially short-pulse lasers, in the order of picoseconds generated by, e.g., mode-locking techniques.

Broadening the linewidth of a laser light to reduce the temporal coherence can be achieved by a number of ways. For example, in U.S. Pat. No. 5,274,494, Rafanelli, et al. described a system, in which a coherent light impinged into a Raman cell and the spectral bandwidth was broadened. In U.S. Pat. Nos. 6,600,590 and 6,625,381, Roddy and Markis invented a method of using RF signal injection for speckle reduction. However, the success was limited because only a small number of longitudinal modes could be produced. Ideally, the spectral bandwidth for a projection display light source should be on the order of several nanometers, e.g., 5- to 15-nm. Such a light source could be considered quasi-monochromatic, which is sufficiently broadband for the cancellation of speckle yet sufficiently narrowband for color purity. Unfortunately, there is simply no laser-based RGB light source in existence with these properties.

In U.S. Pat. No. 6,191,887, Michaloski, et al. disclosed a speckle reduction system, which divides pulses of coherent radiation into successions of temporally separated and spatially aberrated pulselets. These pulselets, which are circulated through delay lines and modified by spatial aberrators therein, produce a succession of different speckle patterns that can be averaged within the integration interval of a detector to reduce speckle contrast.

Independent, i.e., uncorrelated and non-interfering, speckle patterns can also be created due to disturbance of the phase coherency between the interfering beams and speckle noise is reduced by time averaging of these patterns. One approach to speckle reduction by time averaging of the phase shift was described in U.S. Pat. No. 4,035,068, wherein a rotating diffuser was used.

Another approach to reducing the temporal coherence is to split the illuminating wavefront into beamlets and delay them relative to each other by an interval longer than the coherence time of the laser, as taught by Rasmussen et al. in U.S. Pat. No. 5,224,200, as well as by Wang et al.

Another family of speckle reduction solutions is based on disturbance of spatial coherence of the laser beams through, e.g., optical path randomization. This can be realized by vibrating the display screen to dynamically vary the speckle pattern, as described by Thompson et al. in U.S. Pat. No. 5,272,473, or by coupling the laser light into a multimode optical fiber and vibrating the fiber to cause mode-scrambling, as described in U.S. Pat. No. 3,588,217, issued to Mathisen. These approaches, however, may not be suitable for high-speed machine vision systems.

Alternatively, reducing the visibility of the speckle pattern can be based on a diffusing element that moves or vibrates within the projector system, typically at an intermediate image plane, for angle diversity, as disclosed in U.S. Pat. No. 4,035,068, issued to Rawson. One limitation of such approaches is that the diffusion must occur precisely at the image plane. In addition, complicated projection lenses are required to provide an intermediate image plane. A more preferable approach involves dynamically diffusing the laser beam in the illumination path through a rotating diffuser or a rotating plate of variable thickness, as disclosed in U.S. Pat. Nos. 3,490,827, 5,313,479, and 6,005,722. However, it is hard to control the illumination brightness while achieving sufficient uniformity in a compact system.

Reduction of spatial coherence can also be realized by the use of a rotating microlens array to create a plurality of incoherent light sources, as described in U.S. Pat. No. 6,081,381.

In addition to temporal and spatial averages, speckle noise may be reduced by other means. For example, speckle reduction may be based on polarization diversity, in particular, based on overlapping two beams with two orthogonal polarizations, as disclosed in U.S. Pat. No. 4,511,220. Another example of using polarization averaging to reduce laser speckle is given in U.S. Pat. No. 6,956,878. These methods, however, may be insufficient for highly coherent lasers because there are only two uncorrelated components. The performance may be improved by increasing the number of polarization states of the laser beam, as described by Miron in United States Patent Application No. 20050008290.

Another non-time averaging approach for reducing the speckle was based on diversity of phase retardations. For example, as described in U.S. Pat. No. 6,169,634, a plurality of optical fibers of various lengths introduced different phase retardations of the incident wavefront. Phase retardation may also be a result of two polarization components traveling in an anisotropic optical element. Again, the speckle reduction based on these schemes was insignificant.

Attempts to speckle reduction in laser display systems continue in recent years. As an example, in U.S. Pat. No. 6,323,984, Trisnadi described a laser projection system, which used a wavefront modulator to change the spherical wavefront incident on it. The wavefront modulator is located at an intermediate image plane within the imaging system, rather than within the illumination system. As a result, the wavefront at the output is no longer spherical but is still spatially coherent with well-defined phase relationships between the different points of the wavefront. By vibrating the wavefront across a direction perpendicular to the incident beam, laser speckle can be reduced by time averaging. However, the effects are limited.

More recently, in U.S. Pat. No. 6,747,781 and United States Patent Application No. 20040008399, Trisnadi described a method of reducing speckle, which includes steps of dividing a laser illuminated area into phase cells, subdividing the phase cells into cell partitions, and applying a temporal phase variation to the cell partitions within an integration time of an intensity detector viewing the laser illuminated area.

As another example, in U.S. Pat. No. 6,577,429, Kurtz, et al. demonstrated a laser display system, in which speckle was reduced by employing an electrically controllable de-speckle modulator positioned within the illumination portion of the optical system rather than within the imaging optics. One drawback of such image display systems is that they rely upon relatively large and massive moving components, which makes it difficult to achieve real-time projection of high-resolution motion images.

Furthermore, in U.S. Pat. Nos. 6,304,237 and 6,774,881, as well as in United States Patent Application No. 20020018036, issued to Karakawa, an RGB pulsed laser source was demonstrated. Speckle noise in the green spectral range was reduced by introducing spatial incoherency via an etalon and in the red spectral range was reduced by multi-mode operation and spectrum incoherency. Unfortunately, speckle reduction in the blue spectral range was ineffective. In addition, the laser operation was limited to pulsed mode, which generally increases amplitude noise, and the speckle reduction was limited.

Similarly, in U.S. Pat. No. 6,483,556, Karakawa demonstrated another laser video display system, comprising a red light generated from KTA based intracavity optical parametric oscillation (OPO) and SFM, a green light from a CW lamp pumped, repetitively Q-switched, frequency doubled Nd:YAG laser, and a blue light from frequency doubled Ti:Sapphire laser. Spectral noise of the green light was reduced with controlled multimode operation in transverse direction. However, no speckle reduction in the red and blue spectral ranges was mentioned. Again, the operation was restricted to pulsed mode.

A bandwidth-enhanced laser display system was invented by Manni, et al. As disclosed in U.S. Pat. No. 6,975,294, the laser image system includes 1-D or 2-D arrays of independent laser emitters. Each emitter has a spectral bandwidth, centered at some arbitrary wavelength, which can be slightly different from the central wavelengths of other elements in the array. Spatial superposition of these radiations results in a broadened bandwidth, which reduces speckle in a displayed image.

Previous methods for speckle reduction such as oscillatory motion, active diffuser, diffractive optical elements with or without rotation, wavefront modulation, spatial light modulation based on electromechanical grating, arrays of independent laser emitters, multiple Raman cells, or Doppler shift are complex and cause significant power losses. In addition, these methods may be ineffective or merely partially effective to some wavelengths that cannot be directly generated from a laser diode or from harmonic generation of a diode-pumped solid-state (DPSS) laser or from an ultra-compact laser based on the SFM schemes.

SUMMARY OF THE INVENTION

It is therefore an object of the present invention to provide a method and associated apparatus for enabling a low speckle noise, compact, robust, efficient, and cost-effective laser source that can be used in a full color image display system.

From one aspect of this invention, intracavity beam combining and sum frequency mixing are used for generation of red, green, and blue lights. The two fundamental laser beams are generated from two independent active regions in separate cavities, resonated at the appropriate wavelengths. These two fundamental laser beams are linearly polarized with mutually orthogonal polarizations and are combined based on the walk-off effect in a birefringent crystal to generate the desired wavelength by means of intracavity SFM in a nonlinear optical (NLO) crystal.

From another aspect of this invention, the emission spectra of the fundamental laser beams are of broadband and flat-top spectral output is obtained in the resonators formed with specially coated mirrors due to the gain flattening effects.

From the third aspect of this invention, chirped dielectric mirrors of positive dispersive properties are used for enhancing phase shift difference involved in reflection of various oscillation modes. Laser speckle is reduced due to the intentionally introduced optical phase distortions.

From the fourth aspect of this invention, one of the fundamental wavelengths can be produced by a laser diode controlled by an RF modulated drive current, while the second fundamental wavelength is produced from a solid-state gain medium. These two fundamental laser beams are combined based on the walk-off effect in a birefringent crystal to generate the desired wavelength by means of SFM in a nonlinear optical crystal. Due to the RF modulation, the laser diode is forced to operate at multimode, leading to low coherence and low speckle noise output.

From the fifth aspect of this invention, one of the fundamental wavelengths can be produced by an optically bonded nonlinear frequency conversion device such as Optical Parametric Oscillator (OPO), while the second fundamental wavelength is produced from a solid-state gain medium. These two fundamental laser beams are combined based on the walk-off effect in a birefringent crystal to generate the desired wavelength by means of SFM in a nonlinear optical crystal. The pump source of the OPO can be a laser diode with RF modulation or other devices, preferably operated in multimode.

From the sixth aspect of this invention, the longitudinal modes of the first and second fundamental beams are inherently spaced unequally. Mode degeneration does not exist during sum frequency mixing. Consequently, the number of longitudinal modes in laser output is multiplied and the mode spacing is narrowed from the input spectra. This greatly reduces speckle noise. In addition, since the output spectrum always consists of unevenly spaced modes, risks associated with self mode locking or Q-switching can be eliminated.

From the seventh aspect of this invention, two or more colors may be simultaneously produced from a monolithic microchip laser, comprising a stack of layers. Each layer is an independent laser, producing one monochromatic light based on intracavity beam combining and sum frequency mixing.

From the eighth aspect of this invention, the inventive laser device can be operated in CW or pulsed mode. With proper selection of the materials, elements, and parameters, laser output at various wavelengths can be produced. In particular, red, green, and blue lights can be produced separately or simultaneously in a monolithic microchip laser adaptable for applications such as low speckle color image display systems.

BRIEF DESCRIPTION OF THE DRAWINGS

This invention may be more completely understood by reading the following detailed description of various embodiments in connection with the accompanying drawings, in which:

FIG. 3 is a schematic illustration of another preferred embodiment of a monolithic microchip laser according to the present invention;

FIG. 4 shows gain flattening effects achieved by the use of a mirror with reflectivity inversely proportional to the gain curve of an active medium;

FIG. 6A shows an exemplary mode structure resulted from SFM process of two multimode laser beams;

FIG. 6B shows wavelength matrices for the two input fundamental beams and the SFM output beam. The two input beams are both centered at 1064.3 nm, while the output beam is centered at 532.15 nm.

DETAILED DECRIPTION OF THE INVENTION

Figure 1A:
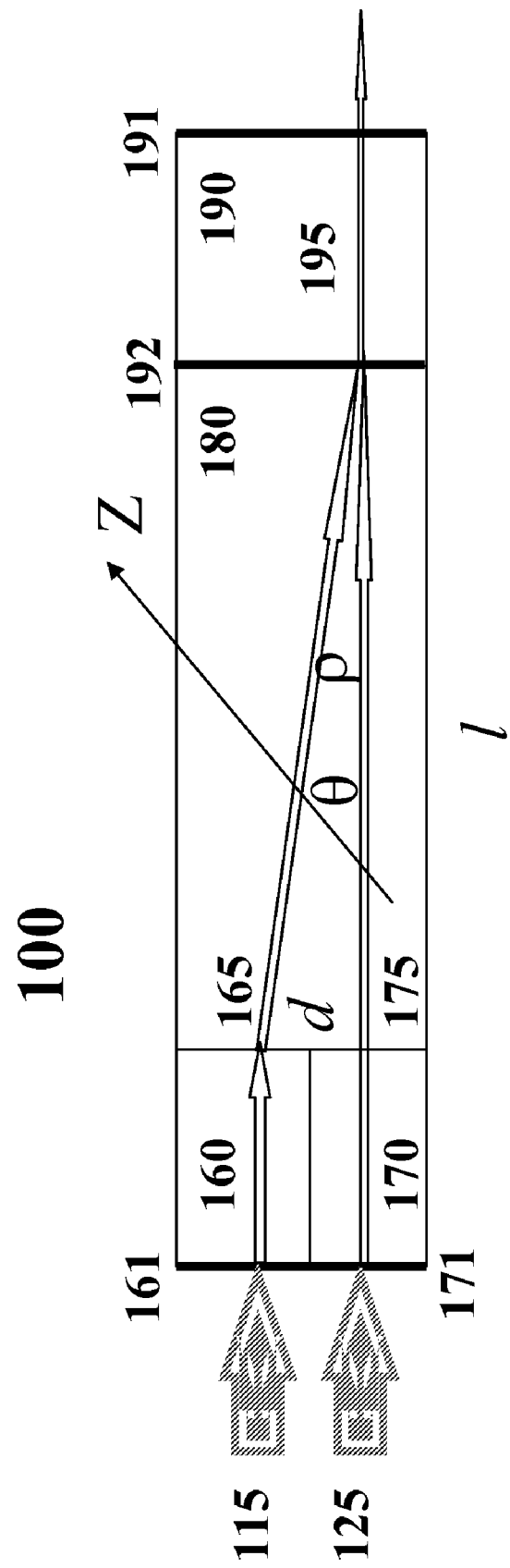
FIG. 1A is a schematic illustration of a preferred embodiment of a monolithic microchip laser according to the present invention.

Referring now to the drawings and in particular to FIG 1A, wherein a first preferred embodiment of the monolithic microchip laser constructed according to the present invention is shown in a schematic form. The monolithic microchip laser 100 comprises pumping lights 115 and 125, laser gain media 160 and 170, a birefringent crystal 180, and a nonlinear optical crystal 190 for sum frequency mixing. These crystals are optically bonded each other. With this monolithic architecture, the intrinsic passive cavity loss is minimized, while the thermal and mechanical stabilities of the cavity are improved.

For high-efficiency and low-noise operation, the birefringent crystal 180 should be transparent to the fundamental wavelengths, normally in the IR region. Preferably, the birefringent crystal 180 is short in length and has a high birefringence, i.e., wide differences between the refractive indexes of ordinary (o-) and extraordinary (e-) rays. One example of the crystals with these properties is rutile ($TiO_2$). The optimized length of the birefringent crystal 180, l=d/tan ρ, where d is the distance between the two pump lights 115 and 125 and ρ is the walk-off angle. For a given birefringent crystal and a given d, the walk-off angle ρ should be maximized. Consequently, the cut angle $\theta_c$ of the birefringent crystal 180, which is the angle between the optic axis Z and the normal to the crystal surface, is preferably π/4 or 3π/4, depending on the type of the crystal.

Cavity mirrors 161, 171, and 191 are dielectric coatings and are respectively deposited onto the exterior surfaces of crystals 160, 170, and 190 to provide high reflectance and/or high transmittance at the desired wavelengths. In particular, to produce laser output at $\lambda_3$, the exterior surface 161 of the gain medium 160 is coated with materials highly reflective (HR) at the first fundamental wavelength $\lambda_1$ while highly transmissive (HT) at the first pump wavelength $\lambda_{p1}$, which matches the absorption peak of the gain medium 160. Similarly, the exterior surface 171 of the gain medium 170 is coated with materials highly reflective at the second fundamental wavelength $\lambda_2$ while highly transmissive at the second pump wavelength $\lambda_{p2}$, which matches the peak absorption of the gain medium 170. The coating 191 on another side of the microchip laser 100 is HT at the mixed wavelength $\lambda_3=\lambda_1\lambda_2/(\lambda_1+\lambda_2)$, and HR at $\lambda_1$ and $\lambda_2$. The interfacial coating 192 between the crystals 180 and 190 is highly reflective to the mixed wavelength $\lambda_3$ for second-pass SFM and antireflective (AR) to the fundamental wavelengths $\lambda_1$ and $\lambda_2$. The mirrors 161 and 191 form a cavity resonating at the first fundamental wavelength $\lambda_1$, while the mirrors 171 and 191 form a cavity resonating at the second fundamental wavelength $\lambda_2$. Advantageously, these dielectric mirrors are gain-conjugated to obtain flat-top spectrum and/or chirped to enhance wavelength-dependent phase shift involved in reflection of longitudinal modes.

Alternatively the output coupler 191 can be replaced by a concave mirror. With appropriate curvature, half-confocal cavities can be formed, which improves the beam collimation and optical stability, especially when high power and/or small beam size are involved. In addition, locating the beam waist in the NLO crystal is of benefit to spatial overlap and, therefore, the efficiency for nonlinear frequency mixing.

In laser operation, the pump light 115 activates the gain media 160 while the pump light 125 activates the gain medium 170. One laser oscillation is formed between mirrors 161 and 191 and generates a laser beam 165 having the first fundamental wavelength $\lambda_1$. Another laser oscillation is formed between mirrors 171 and 191, generating a laser beam 175 with the second fundamental wavelength $\lambda_2$. Preferably, the polarizations of these two laser beams are mutually orthogonal with proper orientations relative to the birefringent crystal 180 to form e-ray and o-ray, respectively. The laser beams 165 and 175 are combined in NLO 190 with type TI phase matching for SFM to produce a new laser beam 195 with the reduced wavelength $\lambda_3=\lambda_1\lambda_2/(\lambda_1+\lambda_2)$ and polarization o if 190 is a positive crystal ($n_o<n_e$) or polarization e if 190 is a negative crystal ($n_o>n_e$). The newly generated laser beam 195 is extracted through the output coupler 191.

The gain media 160 and 170 can be of same type or different. For materials with natural birefringence such as $Nd:YVO_4$, the stimulated emission is polarization dependent. With appropriate orientations of 160 and 170 relative to 180, the desired e-ray and o-ray can be produced. For isotropic materials such as Nd:YAG, the stimulated emission has no polarization preference. The gain media 160 and 170 can be two separate regions in a single crystal. Laser emissions with unwanted polarizations and/or wavelengths can be suppressed by the walk-off effect in the birefringent crystal 180. There are some other crystals, in which two radiative transitions of different polarization states may be obtained from same upper and lower energy levels. For example, upon excitation by a pump light to energy level $^4F_{3/2}$, the extraordinary transition between $^4F_{3/2}$ and $^4I_{11/2}$ corresponding to wavelength of 1047 nm (π) and the ordinary transition between the same energy levels corresponding to wavelength of 1053 nm (σ) may occur simultaneously in Nd:YLF, with nearly equivalent stimulated emission cross-sections. Lasing at undesired wavelength can be suppressed by orienting its polarization along unfavorable direction of the birefringent crystal 180. Our inventive teachings allow for selection of gain media from a large group of materials.

According to our inventive teachings, the pump lights 115 and 125 can be generated from two separated laser diodes, or two diode submounts packaged together for compact foot print, or two diodes packaged into a monolithic device to constitute a dual-emitter, or two fiber-coupled emitters, or a pump diode together with a beam splitting mechanism. There are a number of beam splitting mechanisms available. For example, the beam splitter may be a double PBS (polarized beam splitter), or prisms with polarization-sensitive coating, or a mirror together with a single PBS, or a birefringent crystal, or any combination of these components. By adjusting the polarization orientation of a free-space pump diode, the intensity ratio of the two split components can be optimized.

Through introducing fluctuations of population inversion in the gain medium, optical noise of pump sources may be transferred to the target solid-state laser. This problem can be solved by stabilizing the pump laser diode. When controlled by a drive current, which is modulated by a radio frequency waveform, the laser diode is repeatedly turned on and off, resulting in a multimode operation. Preferably, the fluorescence lifetime of the gain medium upper state is much longer than the interval of the RF modulation. Therefore, mode transitions due to on-off operation are not responded.

To achieve laser operations of high efficiency and low optical noise, keeping the two pump beams as close as possible is preferred. Each pump beam is optically coupled to its corresponding laser gain medium through a direct coupling at close distance or through a set of beam shaping lenses or though a micro-integrated lens array. In the last embodiment, the glass lens array can be optically bonded to the outer surface of the gain medium to minimize the transmission loss. Micro-lens arrays including GRIN (gradient index) lens arrays can be fabricated by processing lithography and etching on proper films deposited on substrates, which, in the configuration of FIG. 1A, are the gain media 160 and 170.

Our inventive teachings allow of using a single gain medium to produce two fundamental laser beams from two separated regions. This makes high-volume production feasible. In particular, the pump lens arrays, gain medium, birefringent crystal, and nonlinear crystal can be grown into layers with uniform coatings at appropriate wavelengths, which are preferably of broadband, and the integrated crystal is then cut into small pieces, each forms a monolithic microchip laser. With this scheme, the productivity is greatly improved, while the cost is lowered.

There are a number of other advantages associated with our inventive laser device. First, power and polarization of the pump lights 115 and 125 can be individually adjusted to maximize pumping efficiency and optimize wavelength conversion. Second, laser oscillations are generated in different active regions so that problems related to intensity mismatch of the mixed fundamental radiations in a dual-wavelength gain medium are resolved. A further advantage is attributed to elimination of the "green problem" because the fundamental wavelengths are generated in separate cavities. Due to their independent operation, the two fundamental lasers can be aligned independently to reach optimized overlap in the nonlinear crystal. In particular, the laser with a relatively high gain and, consequently less sensitivity to the ambient, has a slightly larger beam size so that the other laser with a smaller beam size will be easily overlapped. This makes the SFM laser output more stable, while the energy loss from the edge of the larger laser beam is limited.

Neodymium-doped Yttrium Vanadate (Nd:YVO$_4$) has several spectroscopic properties that are particularly relevant to our inventive device. Some wavelengths achievable from such devices based on the inventive configuration shown in FIG. 1A are summarized in Table I. Advantageously, these wavelengths are particularly useful for laser display systems and biomedical instrumentation applications. Other promising gain media include, but not limited to, Neodymium-doped Gadolinium Orthovanadate (Nd:GdVO$_4$) and Neodymium-doped Yttrium Aluminum Garnet (Nd:YAG). Tables II and III list some wavelengths achievable from these materials based on our inventive configuration. It should be pointed out that there is no limitation on the achievable wavelengths. In fact, a variety of useful wavelengths can be achieved by appropriate selection of lasing materials.

For better understanding of our inventive teachings, an exemplary system is focused. In particular, a laser device that produces low speckle noise green light 532 nm is described in detail.

Figure 1B:
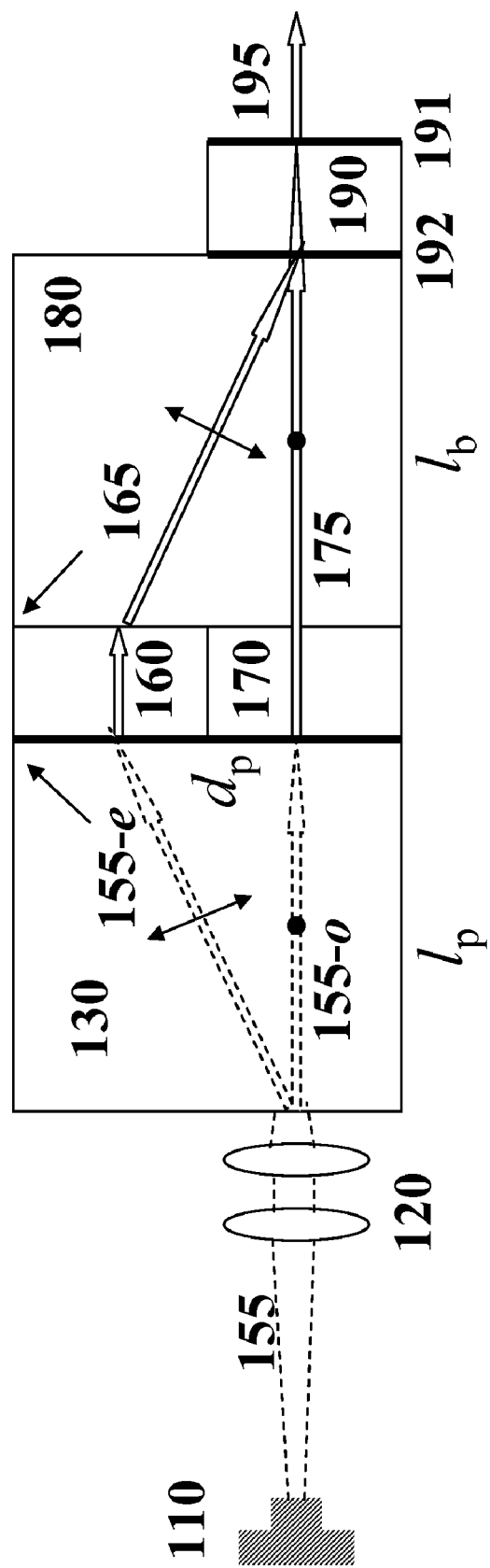
FIG. 1B is a schematic illustration of another preferred embodiment of a monolithic microchip laser using a birefringent crystal for pump beam split.

With reference to another preferred embodiment. As shown in FIG 1B, the two gain media 160 and 170 are a-cut Nd:YVO$_4$, the birefringent crystals 130 and 180 are TiO$_2$ or un-doped YVO$_4$ or the like, respectively cut at 45 degree and 135 degree, for maximum walk-off, and the NLO crystal 190 is KTP or the like. The two fundamental wavelengths $\lambda_1$ and $\lambda_2$ are both 1064 nm.

A pump diode 110 emits the pump light 155 with wavelength of 808 nm to match the absorption spectrum of Nd:YVO$_4$. Due to the walk-off effect in the birefringent crystal 130, the pump beam 155 is split into two components: 155-o and 155-e with mutually orthogonal polarizations. In particular, the polarization of the component 155-e is along the extraordinary $\pi$-direction of the gain medium 160 for favorable absorption. Similarly, the polarization of the component 155-o is along the extraordinary $\pi$-direction of the gain medium 170. As indicated above, these two $\pi$-directions are orthogonal to each other. Advantageously, the polarization orientation of the pump beam 155 is adjustable to optimize the intensity ratio of 155-o to 155-e.

In operation, the pump beams 155-e and 155-o hit their corresponding gain media 160 and 170 and are absorbed therein. Upon excitation from the ground state $^4I_{9/2}$ to the metastable state $^4F_{3/2}$ by these two pumping sources, the laser gain media 160 and 170 produce stimulated emissions at wavelength of 1064 nm. Two fundamental laser beams are thus formed within their respective resonators. Since the Vanadate crystal is birefringent in nature, the laser emission is linearly polarized along the $\pi$-direction. With proper orientations of the crystals 160, 170, and 180, the first fundamental beam 165 with wavelength of 1064 nm is polarized along the principal plane of the birefringent crystal 180 and forms an e ray. On the other hand, the second fundamental beam 175 with wavelength of 1064 nm is an o ray within 180. Owing to the walk-off effect, these two beams are combined at the interface 192 between the birefringent crystal 180 and the nonlinear optical crystal 190. With precise control of the birefringent crystal lengths $l_p$ and $l_b$ and the separation between the two pump beams $d_p$, the two fundamental beams 165 and 175 collinearly enter the nonlinear optical crystal 190 and frequency mixing takes place therein. Through the output coupler 191, a green laser beam 195 with the wavelength 532 nm is produced.

Benefited by the use of Nd:YVO$_4$ as the gain medium, the 1064 nm emission has a relatively broad bandwidth, nearly 1 nm, depending on the doping level and operation temperature. Due to the gain flattening effect induced by the specially coated cavity mirrors with gain compensation, the bandwidth further increases in the resonator. On the other hand, with chirped dielectric mirrors of positive dispersive properties, temporal coherence of longitudinal modes is reduced. Characteristics of gain compensation and positive dispersion can be incorporated into same mirrors or different mirrors, depending on applications.

As another advantage of the present invention, the longitudinal modes of the first and second fundamental beams are inherently spaced unequally. Mode degeneration, which takes place in conventional frequency doubling or sum frequency mixing of two fundamental beams with identical mode spacing, does not exist in our inventive device. Consequently, the number of uncorrelated longitudinal modes in laser output is multiplied and the mode spacing is narrowed from the input spectra. In other words, a large number of uncorrelated modes can be generated in a nonlinear optical crystal with a reasonably wide phase-matching bandwidth. This mode multiplication effect greatly reduces speckle noise. In addition, since the output spectrum always consists of unevenly spaced modes, risks associated with self mode locking or Q-switching can be eliminated.

It is understood that selection of the specific materials, elements and parameters are a matter of design choice and by no means of a restriction to the present invention. It should also be appreciated by those skilled in the art that various substitutions and changes may be made without departing from the spirit of the invention. In particular, the inventive method and apparatus may be used to generate lights of other wavelengths. For example to generate a blue light at 457 nm, the transition in the gain media takes place between the states $^4F_{3/2}$ and $_4I_{9/2}$ to produce stimulated emission at 914 nm. Accordingly, the mirrors 161 and 171 are now highly reflective at 914 nm while highly transmissive at 808 nm, 1064 nm and 1342 nm. High transmittance at 1064 nm and 1342 nm is necessary to prevent high-gain transitions from lasing. As is well known, the transition $^4F_{3/2} \rightarrow {}^4I_{9/2}$ for 914 nm is about one order of magnitude weaker than the transition $4F_{3/2} \rightarrow {}^4I_{11/2}$ for 1064 nm and the transition $^4F_{3/2} \rightarrow {}^4I_{13/2}$ for 1342 nm. Furthermore, the coating 191 on another side of microchip 101 should be HT at 457 nm, and HR at 914 nm. Preferably, the dielectric mirrors are specially coated with gain compensation for obtaining flat-top spectrum and chirped for reducing temporal coherence of longitudinal modes. Again, the gain compensation and positive dispersive properties can be incorporated into same mirror or different mirrors. In addition to the coating requirements, effective heat dissipation is another key factor to obtain 457 nm laser output. One possible selection of the NLO crystal is BBO. For NLO crystals requiring critical phase matching such as BBO, two crystals are typically used for walk-off compensation. In particular, these two crystals are optically bonded with their principal planes symmetric to the interface, so that the spatial overlap of the beams and thus the conversion efficiency are improved.

Figure 2A:
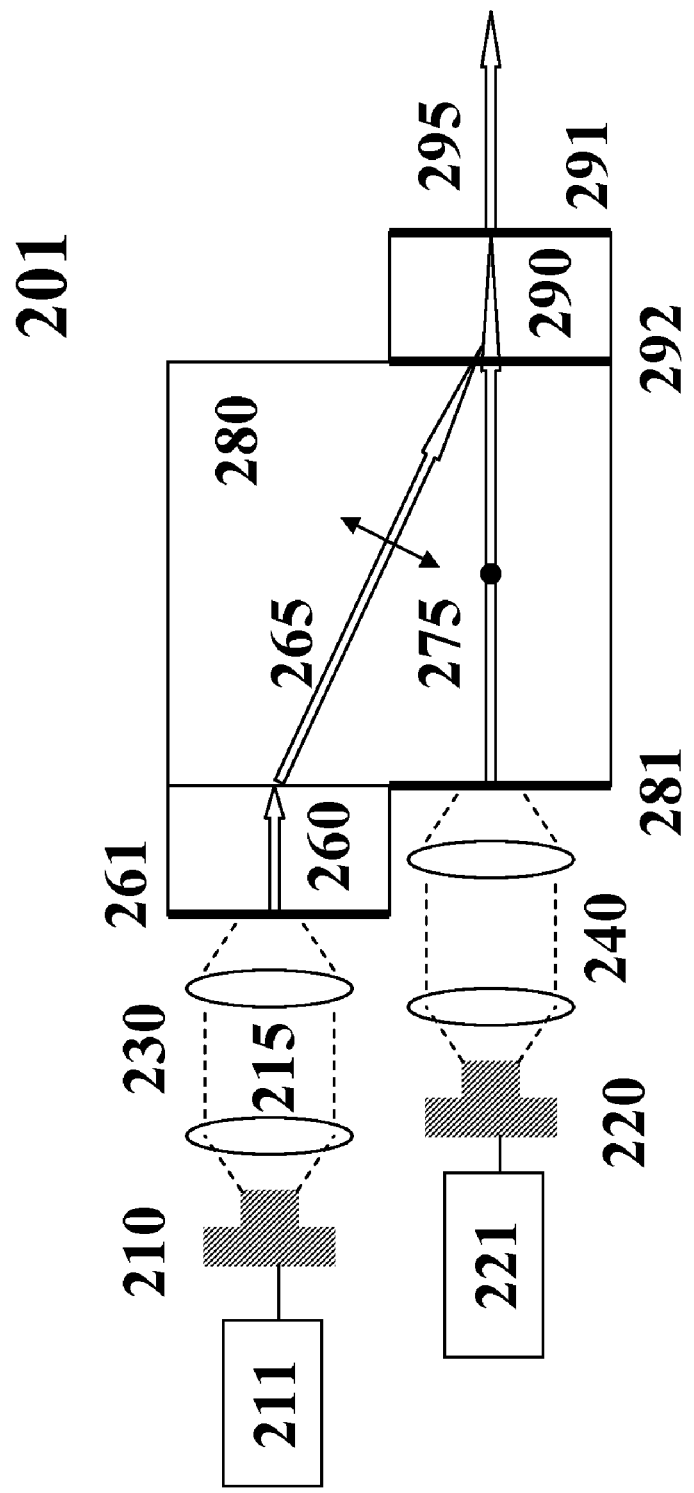
FIG. 2A is a schematic illustration of an alternative embodiment of a monolithic microchip laser according to the present invention.

FIG. 2A shows another preferred embodiment of the present invention. The hybrid laser device 201 is composed of a pump diode 210 for emitting pump light 215, a beam shaping optics 230 for focusing the pump light 215, a gain medium 260 for producing the first fundamental beam 265, a laser diode 220 for producing the second fundamental beam 275, a beam shaping optics 240 for focusing the beam 275, a birefringent crystal 280 for combing the fundamental beams 265 and 275, and a nonlinear optical crystal 290 for sum frequency generation. These crystals are optically bonded each other. The beam shaping optics 230 and 240 may be a set of lenses or micro-integrated lens arrays optically bonded to the outer surface of the birefringent crystals 260 and 280 to minimize the transmission loss.

The exterior surface 261 of the gain medium 260 is coated with materials highly reflective at the first fundamental wavelength $\lambda_1$ while highly transmissive at the peak absorption wavelength $\lambda_{p1}$. On the other hand, the exterior surface 281 of the birefringent crystal 280 is coated with materials highly transmissive at the second fundamental wavelength $\lambda_2$. The coating 291 on another side of the microchip laser 200 is HT at $\lambda_3$ and HR at $\lambda_1$ and $\lambda_2$. The coating 292 between the crystals 280 and 290 is highly reflective to the mixed wavelength $\lambda_3$ for the second-pass SFM and antireflective to the fundamental wavelengths $\lambda_1$ and $\lambda_2$. The mirrors 261 and 291 form a cavity resonating at the first fundamental wavelength $\lambda_1$. Advantageously, these mirrors are coated with gain compensation and/or chirped with positive dispersion for spectral broadening and/or temporal incoherence.

For an exemplary description, consider a device that produces a red light at 628 nm. In this hybrid laser device, the gain medium 260 is a-cut Nd:YVO$_4$, the birefringent crystal 280 is an un-doped YVO$_4$ crystal or the like, and the NLO crystal 290 is KTP or the like. Viewed from another aspect, the first fundamental wavelength $\lambda_1$ is 1064 nm and the second fundamental wavelength $\lambda_2$ is 1530 nm. High power laser diode emitting 1530 nm light is commercially available.

In operation, the pump diode 210 emits a light with wavelength of 808 nm to match the absorption spectrum of Nd:YVO$_4$. Advantageously, the polarization of pump beam 215 is along the extraordinary π-direction of the gain medium 260 for favorable absorption. Importantly, the π-direction of the gain medium 260 is parallel to the principal plane of the birefringent crystal 280. Therefore, the first fundamental beam 265 is an e-ray in 280. On the other hand, the light emitted from the laser diode 220 is linearly polarized with the polarization normal to the principal plane of the birefringent crystal 280 and propagates in the crystal as an o-ray. Due to the walk-off effect, the two fundamental laser beams 265 and 275 are combined at the interface 292 and mixed in the NLO crystal 290 to produce the red light.

Another advantageous feature of this embodiment is the use of drive current controllers 211 and 221 for stabilizing operations of the laser diodes 210 and 220. The drive current controllers 211 and 221 may be separated or integrated into a single circuit. The drive current controller 221 provides for the laser diode 220 a drive current modulated with a radio frequency waveform, which may be a sine wave, a rectified sine wave, a distorted sine wave, or other waves, preferably, with a high duty ratio. With injection of an RF waveform, the laser diode 220 is forced to operate at multimode. As a consequence, the SFM laser output is also multimode with low optical noise and reduced speckle. Injection of RF modulated drive current into a laser diode can be used for stabilizing the intensity and reducing noise. With our inventive teachings, it can also be applied to reducing speckle. Due to the mode multiplication effect during our inventive SFM process, multimode operation of the laser diode 220 is particularly beneficial to speckle reduction.

Figure 2B:
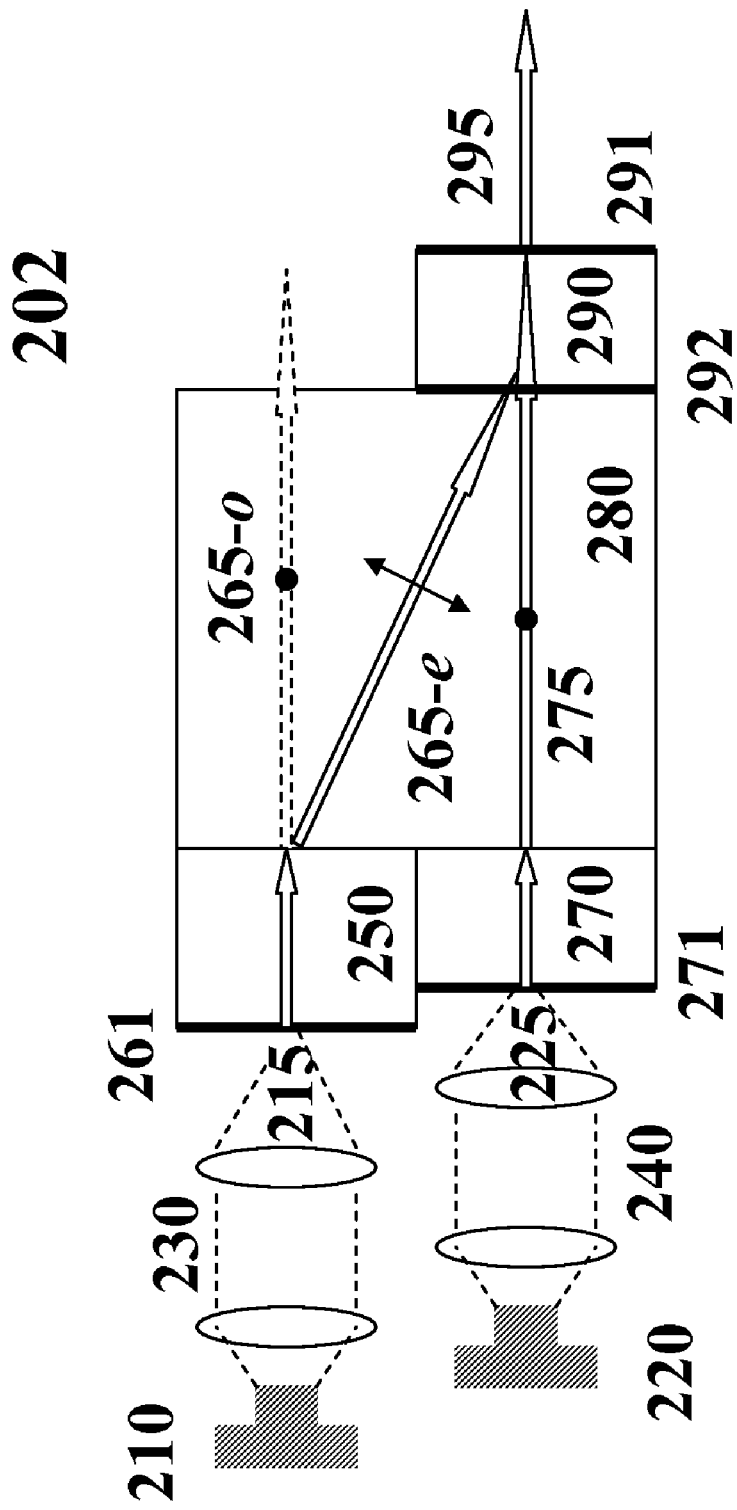
FIG. 2B is a schematic illustration of another alternative embodiment of a monolithic microchip laser according to the present invention.

FIG. 2B shows yet another preferred embodiment of the present invention. The hybrid laser device 202 is composed of a pump diode 210 for emitting pump light 215, a beam shaping optics 230 for focusing the pump light 215, a nonlinear optical crystal 250 for optical parametric generation, another pump diode 220 for emitting pump light 225, a beam shaping optics 240 for focusing the pump light 225, gain medium 270 for producing the second fundamental beam 275. Depending on the type of the nonlinear optical crystal 250 and the phase matching conditions, the signal or the idler wave 265-e is resonantly circulated in the cavity formed between the mirrors 261 and 291. Another component, 265-o, escapes from the cavity and the oscillation is suppressed. Preferably, the laser diode 210 is RF modulated so that the first fundamental beam 265-e thus generated is of broadband and multimode. Through the birefringent crystal 280, the fundamental beams 265-e and 275 are combined, and sum frequency is generated in the nonlinear optical crystal 290. These crystals are optically bonded each other. Again, the beam shaping optics 240 and 230 may be a set of lenses or micro-integrated lens arrays optically bonded to the outer surface of the birefringent crystals 270 and the nonlinear optical crystal 250.

Alternatively, the fundamental beam generated from the OPO can be an o-ray, while the fundamental beam generated in the gain medium is an e-ray. Moreover, the pump beam for OPO can be produced from a laser diode or other light sources. For example, a KTP OPO pumped by photons of 1.06 μm can generate eye-safe signal wave at about 1.6 μm. By combining the beam of wavelength 1.6 μm with another fundamental beam with the wavelength of 1.06 μm in the nonlinear optical crystal 290, a red light at 638 nm can be generated by SFM.

As a further advantage of the present invention, multi color laser output can be produced from a monolithic device. With reference to FIG. 3, wherein an RGB laser display system 300 is shown in a 3-D view. Viewed from top to bottom, the three layers produce three laser lights of three different wavelengths, respectively, $\lambda_1$=628 nm (Red), $\lambda_2$=532 nm (Green), and $\lambda_3$=457 nm (Blue). For clarity in illustration, the accessory elements including pump diodes are not shown in this graph.

In the first layer, the red light is produced from SFM of the first fundamental wavelength $\lambda_{11}$=1064 nm generated by the gain medium 361, preferably Nd:YVO$_4$, and the second fundamental wavelength $\lambda_{12}$=1530 nm emitted from a laser diode (not shown in this graph). Again, the laser diode is operated in multimode due to RF modulation. The two fundamental beams are combined due to the walk-off effect in the birefringent crystal 381, preferably TiO$_2$ or un-doped YVO$_4$ or the like, and mixed in the NLO 391, which can be KTP or the like. Red light can also be generated by SFM of two fundamental beams, having a wavelength of, e.g., 1319 nm. In this case, the two active regions are in the same gain medium, which is preferably Nd:YAG. In another alternative embodiment, one of the fundamental beams is produced by other light sources such as OPO to generate red light of somewhat different wavelength.

Independently, the green light is produced in the second layer from intracavity SFM of the first fundamental wavelength $\lambda_{21}$=1064 nm generated by the gain medium 362 and the second fundamental wavelength $\lambda_{22}$=1064 nm generated by the gain medium 372. A preferred selection of the gain media is Nd:YVO$_4$. These two gain media are oriented having their principal planes orthogonal to each other. The two fundamental beams are combined due to the walk-off effect in the birefringent crystal 382, preferably un-doped YVO$_4$ or TiO$_2$ or the like, and mixed in the NLO 392, which can be KTP or the like. Of course, one or both of the fundamental beams can be produced from other laser sources to generate green light of somewhat different wavelength.

Similarly, the blue light is produced in the third layer from intracavity SFM of the first fundamental wavelength $\lambda_{31}$=914 nm generated by the gain medium 363 and the second fundamental wavelength $\lambda_{32}$=914 nm generated by the gain medium 373. A preferred selection of the gain media is Nd:YVO$_4$. These two gain media are oriented having their principal planes orthogonal to each other. The two fundamental beams are combined due to the walk-off effect in the birefringent crystal 383, preferably un-doped YVO$_4$ or TiO$_2$ or the like, and mixed in the NLO 393, which can be BBO or the like. In order to achieve laser oscillation at 914 nm, strong transitions at 1064 nm and 1342 nm must be suppressed and effective heat dissipation is required. Again, one or both of the fundamental beams can be produced from other laser sources to generate blue light of somewhat different wavelength.

It is understood by those skilled in the art that selection of the gain media, transition lines, and crystal materials is a matter of engineering design. It should also be mentioned that the present invention is highly flexible. There may be many alternative configurations without departure from the principles of our inventive teachings.

Broadband multimode operation for speckle reduction is a feature of the present invention. According to our inventive teachings, broadband multimode laser output is achieved by a combination of the following schemes: 1) selection of gain media with proper emission spectra and broadband fluorescence curves; 2) selection of NLO materials with phase-matching bandwidths wider than the corresponding gain profiles to support broadband SFM; 3) adoption of mirrors specially coated with gain compensation for obtaining flat-top spectra; 4) adoption of chirped mirrors with positive dispersive properties for reducing temporal coherence among longitudinal modes; 5) repeated on-off laser operation controlled by RF modulated drive current for stabilized multimode output of laser diode; 6) mode multiplication from frequency mixing of two sources with unequally spaced multi longitudinal modes.

A conceptual illustration of spectral broadening achieved by the use of a specially coated mirror with wavelength-dependent reflectivity, which is inversely proportional to the gain curve of an active medium, is given in FIG. 4. With gain compensation, laser output with flat-top spectrum is achievable.

Figure 5:
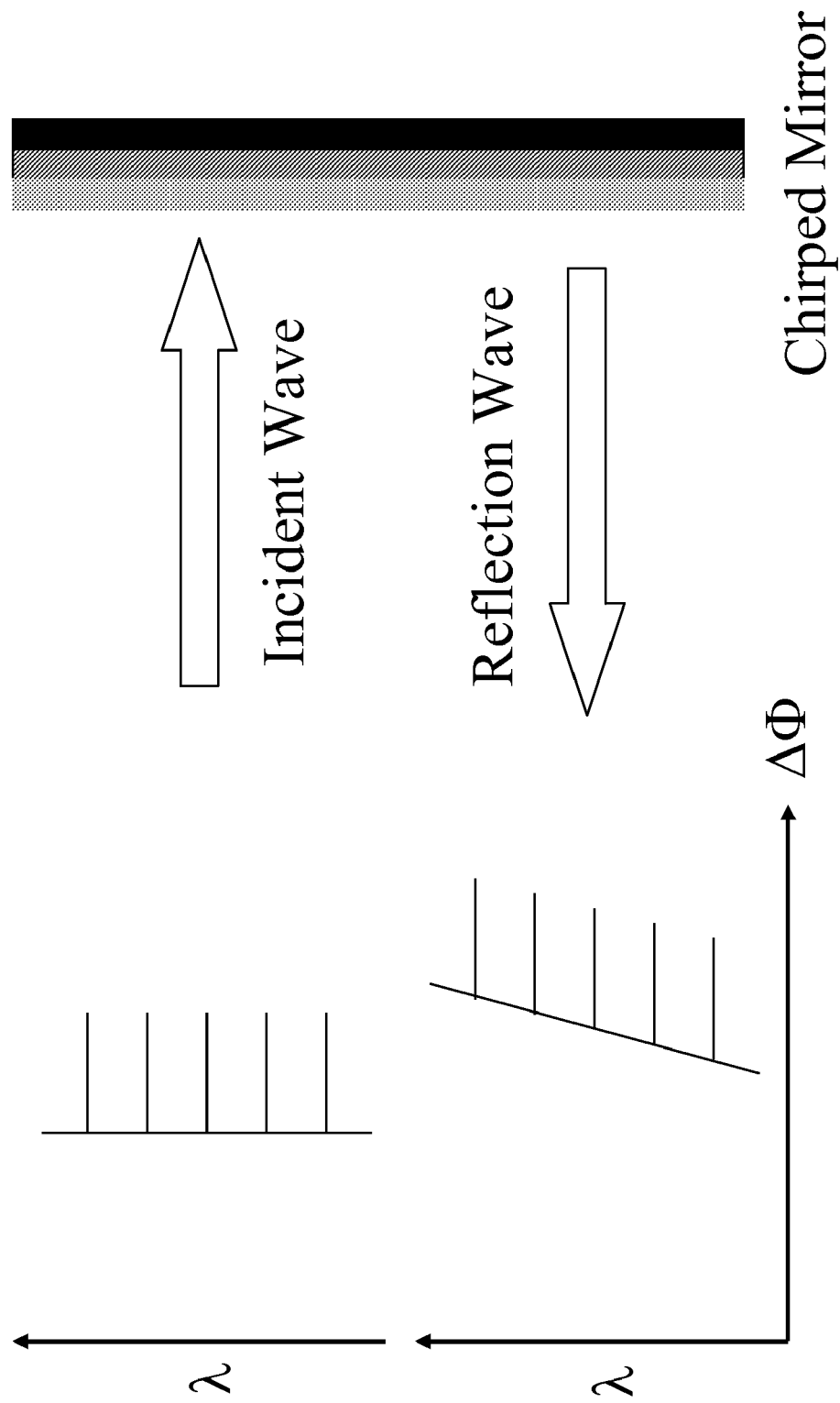
FIG. 5 is a conceptual illustration of chirped dielectric mirror for enhancing phase shift difference involved in reflection of various oscillation modes.

Chirped dielectric mirrors are based on wavelength-dependent penetration depth and are widely used for broadband feedback and dispersion control. In sharp contrast to these applications, our inventive teachings employ chirped mirrors of positive dispersive properties to enhance phase shift diversification involved in reflection of different longitudinal modes. With proper selection of NLO materials, all or many of these modes can simultaneously satisfy the phase matching condition. Diversified phase shift may introduce temporal incoherence between longitudinal modes, which benefits speckle reduction. Concept of phase diversification resulted from a chirped mirror with positive dispersive properties is graphically illustrated in FIG. 5.

With sufficiently wide phase matching bandwidth, a fundamental beam of M closely spaced longitudinal modes mixed with another fundamental beam of N closely spaced longitudinal modes leads to a multimode laser output, up to M×N modes, as a result of convolution. If the two fundamental beams have equivalent mode spacing, some of the modes may be degenerated. In cases of SHG or conventional SMF from two fundamental beams with identical wavelength and mode structure, the resultant laser output contains only (2N−1) components, $(N-1)^2$ modes are degenerated. Since the speckle reduction factor is inversely proportional to the square root of the number of independent speckle patterns, mode degeneration degrades the effectiveness of speckle reduction.

Such problems are automatically eliminated in the present invention. According to our inventive teachings, the two fundamental beams always travel through different optical lengths. Their mode structures are inherently different, whether their emission spectra including the central wavelengths are identical or not. During an SFM such as the process described in the forgoing text for generation of red or green or blue light, the number of longitudinal modes is multiplied. Up to $N^2$ modes can be generated and the mode spacing is narrowed from the input spectra. These modes have completely uncorrelated phases and are incoherent. This mode multiplication effect further reduces speckle in the laser output from our inventive device.

For better understanding of the mode multiplication concept, an exemplary mode structure after sum frequency mixing from a beam with five modes in a Gaussian profile and another beam with three modes in a Gaussian profile is displayed in FIG. 6A. The resultant mode structure possesses fifteen modes with uneven spacing and the profile is generally not Gaussian.

For further explanation, consider a device constructed in accordance with the present invention, wherein an e-ray at 1064.3 nm and an o-ray at 1064.3 nm are combined and sum frequency mixed to produce green light at 532.15 nm. Although the central wavelengths of the e-ray and the o-ray are identical, these two beams inherently have different mode structures according to our inventive teachings. A preferred configuration of such devices is shown in FIG. 1A. Assume the length of the walk-off birefringent crystal, specifically, a $\pi/4$ cut un-doped $YVO_4$ birefringent crystal,=12 mm, the length of the NLO, which, in this particular example, is KTP, =3 mm, and the distance between the exterior surface of KTP and the output coupler=6 mm, we obtain the intermode spacing for the e-ray, $\Delta\lambda_e=1.648\times10^{-2}$ nm, and for the o-ray, $\Delta\lambda_o=1.618\times10^{-2}$ nm. FIG. 6B illustrates the SFM process in form of matrix. For simplicity, in this FIG. 6B, only eleven modes centered at 1064.3 nm are considered for each beam. With the specified geometries, these modes span only 0.165 nm for e-ray and 0.162 nm for o-ray. Both are much narrower than the bandwidth of the laser emission at 1064.3 nm, which is almost 1 nm. Even with such a narrow spectral range, 121 non-degenerative modes are thereby produced. Advantageously, these 121 modes span only 0.082 nm, roughly half of the input spectrum. This makes the phase matching requirement less stringent. For KTP at the room temperature, the phase matching bandwidth for e-ray is about 3 nm and for o-ray is about 10.8 nm. Both are wide enough for the mode multiplication. For $Nd:YVO_4$, the FWHM of 1064.3 nm emission spectrum is approximately 0.8 nm, which may contain 48 modes for the e-ray and 49 modes for the o-ray. According to our inventive teachings, 2352 uncorrelated modes can be generated. Advantageously, all of these uncorrelated modes simultaneously satisfy the phase matching condition because they span only 0.4 nm, as determined by $\Delta\lambda_3=(\lambda_3/\lambda_o)^2\Delta\lambda_o+(\lambda_3/\lambda_e)^2\Delta\lambda_e$. These uncorrelated modes generate the same number of uncorrelated patterns. An average of these uncorrelated patterns results in an image of extremely low speckle. As a matter of fact, in comparison with the conventional SFM scheme, our degeneration-free SFM improves the speckle reduction by at least a factor of five. In FIG. 6B, the wavelengths are in units of pm, that is, $10^{-12}$ m.

It should be noted that the above examples are for description only and by no means of limitations of our inventive teachings. It should also be recognized by those skilled in the art that selection of the crystal materials, the doped ions, the coatings, and geometries of microchip cavities is a matter of engineering design.

TABLE I

| $\lambda_1$ (nm) | $\lambda_2$ (nm) | $\lambda_3$ (nm) |
|---|---|---|
| 914 | 914 | 457 |
| 1064 | 914 | 492 |
| 1064 | 1064 | 532 |
| 1342 | 914 | 544 |
| 1064 | 1342 | 593 |
| 1342 | 1342 | 671 |

TABLE II

| $\lambda_1$ (nm) | $\lambda_2$ (nm) | $\lambda_3$ (nm) |
|---|---|---|
| 913 | 913 | 456 |
| 1063 | 913 | 491 |
| 1063 | 1063 | 532 |
| 1341 | 913 | 543 |
| 1063 | 1341 | 593 |
| 1341 | 1341 | 671 |

TABLE III

| $\lambda_1$ (nm) | $\lambda_2$ (nm) | $\lambda_3$ (nm) |
|---|---|---|
| 946 | 946 | 473 |
| 1064 | 946 | 501 |
| 1064 | 1064 | 532 |
| 1319 | 946 | 551 |
| 1064 | 1319 | 589 |
| 1319 | 1319 | 659 |

What is claimed is

1. A low speckle noise monolithic microchip laser comprising:
   two independent laser sources to produce two fundamental beams linearly polarized with mutually orthogonal polarizations;
   a birefringent crystal for tilting propagation direction of one fundamental laser beam with polarization along the principal plane of said birefringent crystal, referred to as e-ray, and for combining said e-ray with another fundamental laser beam with polarization normal to the principal plane of said birefringent crystal, referred to as o-ray, at the output surface; and
   a nonlinear optical crystal optically bonded to the birefringent crystal to generate a new wavelength based on sum frequency mixing of the two fundamental laser beams;
   wherein:
   each independent laser source further comprising a laser gain medium and a pump light;
   the two laser gain media are optically bonded each other, both are optically bonded to the birefringent crystal;
   the two pump lights are substantially parallel to each other and separated by a distance equal to the birefringent crystal length multiplied by the tangent walk-off angle;
   said fundamental laser beams are generated in separate optical cavities with a common portion in the nonlinear optical crystal to eliminate the green problem;
   wherein the exterior surface of the first gain medium, where the first pump beam enters, is coated highly reflective to the first fundamental wavelength and highly transmissive to the first pump wavelength;
   wherein the exterior surface of the second gain medium, where the second pump beam enters, is coated highly reflective to the second fundamental wavelength and highly transmissive to the second pump wavelength;

the exterior surface of the nonlinear optical crystal is coated highly reflective to at least one of the first and second fundamental wavelengths and is highly transmissive to the converted wavelength via sum frequency mixing;

the interface between the birefringent crystal and the nonlinear optical crystal is coated highly transmissive to the first and second fundamental wavelengths and is highly reflective to the converted wavelength via sum frequency mixing;

wherein each of the two fundamental laser beams possesses at least two longitudinal modes such that the mode intervals of the e-ray and o-ray are different, and the sum frequency mixing between the two fundamental beams is non-degenerate, therefore, at least four longitudinal modes with unequal spacing and a narrowed bandwidth present in the laser output;

wherein:

the two pump lights are split from a single light source via a beam splitter;

wherein:

the polarization of the light from the light source is controlled by a wave plate or other polarization-sensitive elements, or a rotation of a free-space laser diode, or an optic fiber;

wherein:

said beam splitter includes any combination of the following: polarization dependent elements including mirrors coated with polarization sensitive materials, polarization beam splitter, birefringent crystal, and prisms coated with polarization sensitive materials.

2. A low speckle noise monolithic microchip laser comprising:

two independent laser sources to produce two fundamental beams linearly polarized with mutually orthogonal polarizations;

a birefringent crystal for tilting propagation direction of one fundamental laser beam with polarization along the principal plane of said birefringent crystal, referred to as e-ray, and for combining said e-ray with another fundamental laser beam with polarization normal to the principal plane of said birefringent crystal, referred to as o-ray, at the output surface; and a nonlinear optical crystal optically bonded to the birefringent crystal to generate a new wavelength based on sum frequency mixing of the two fundamental laser beams;

wherein:

each independent laser source further comprising a laser gain medium and a pump light;

the two laser gain media are optically bonded each other, both are optically bonded to the birefringent crystal;

the two pump lights are substantially parallel to each other and separated by a distance equal to the birefringent crystal length multiplied by the tangent walk-off angle;

said fundamental laser beams are generated in separate optical cavities with a common portion in the nonlinear optical crystal to eliminate the green problem;

wherein the exterior surface of the first gain medium, where the first pump beam enters, is coated highly reflective to the first fundamental wavelength and highly transmissive to the first pump wavelength;

wherein the exterior surface of the second gain medium, where the second pump beam enters, is coated highly reflective to the second fundamental wavelength and highly transmissive to the second pump wavelength;

the exterior surface of the nonlinear optical crystal is coated highly reflective to at least one of the first and second fundamental wavelengths and is highly transmissive to the converted wavelength via sum frequency mixing;

the interface between the birefringent crystal and the nonlinear optical crystal is coated highly transmissive to the first and second fundamental wavelengths and is highly reflective to the convened wavelength via sum frequency mixing;

wherein each of the two fundamental laser beams possesses at least two longitudinal modes such that the mode intervals of the e-ray and o-ray are different, and the sum frequency mixing between the two fundamental beams is non-degenerate, therefore, at least four longitudinal modes with unequal spacing and a narrowed bandwidth present in the laser output;

wherein;

one or more of the cavity mirrors are coated with gain compensation for obtaining flat-top spectra.

3. A low speckle noise monolithic microchip laser comprising:

two or more crystal layers stacked one above one, each layer represents an individual laser, further comprising:

two independent laser sources to produce two fundamental beams;

a birefringent crystal; and a nonlinear optical crystal to generate a new wavelength based on sum frequency mixing of the two fundamental laser beams;

in each laser, at least one fundamental beam is generated by a gain medium that is end-pumped by a pump light;

the birefringent crystal is sandwiched in between the gain medium and the nonlinear optical crystal with optical bonding, which forms an independent optical cavity resonated at the fundamental wavelength;

wherein:

each of the two fundamental laser beams possesses at least two longitudinal modes;

one of the fundamental beams is an e-ray in the birefringent crystal and the other is an o-ray such that at the entrance to the birefringent crystal the e-ray and o-ray are substantially parallel and their separation equals the birefringent crystal length multiplied by the tangent walk-off angle;

the mode intervals of the e-ray and o-ray are different, thereby, the sum frequency mixing between the two fundamental beams is non-degenerate, therefore, the laser output resultant from the sum frequency mixing possesses at least four longitudinal modes with unequal spacing and a narrowed bandwidth wherein:

one or more of the cavity mirrors are coated with gain compensation for obtaining flat-top spectra.

4. A low speckle noise monolithic microchip laser as of claim 1 or claim 2 or claim 3 further comprising:

a laser diode that emits pump light; and a drive circuit that provides an RF-modulated drive current for the laser diode.

5. A low speckle noise monolithic microchip laser as of claim 1 or claim 2 or claim 3, wherein:

one fundamental beam is generated by an a-cut $Nd:YVO_4$ end-pumped by a pump light at 808 nm with $\pi$ polarization, the C-axis of the gain medium is parallel to the principal plane of the birefringent crystal, and the optical cavity is resonated at 1064 nm;

another fundamental beam is generated by an a-cut $Nd:YVO_4$ end-pumped by a pump light at 808 nm with $\pi$ polarization, the C-axis of the gain medium is normal to the principal plane of the birefringent crystal, and the optical cavity is resonated at 1064 nm;

wherein:

said birefringent crystal is TiO$_2$ or un-doped YVO$_4$ or other crystal in which the refractive indexes for the e-ray and o-ray are substantially different;

said nonlinear crystal is KTP;

the exterior surface of the nonlinear crystal is coated highly transmissive to 532 nm.

6. A low speckle noise monolithic microchip laser as of claim 1 or claim 2 or claim 3, wherein:

one fundamental beam is generated by an a-cut Nd:YVO$_4$ end-pumped by a pump light at 808 nm with π polarization, the C-axis of the gain medium is parallel to the principal plane of the birefringent crystal, and the optical cavity is resonated at 914 nm, at least one cavity mirror is coated transmissive to 1064 nm and 1342 nm to suppress the unwanted oscillations;

another fundamental beam is generated by an a-cut Nd:YVO$_4$ end-pumped by a pump light at 808 nm with π polarization, the C-axis of the gain medium is normal to the principal plane of the birefringent crystal, and the optical cavity is resonated at 914 nm, at least one cavity mirror is coated transmissive to 1064 nm and 1342 nm to suppress the unwanted oscillations;

wherein:

said birefringent crystal is TiO$_2$ or un-doped YVO$_4$ or other crystal in which the refractive indexes for the e-ray and o-ray are substantially different;

said nonlinear crystal is BBO;

the exterior surface of the nonlinear crystal is coated highly transmissive to 457 nm;

wherein: the microchip laser further comprises a temperature controller for supporting 914 nm emission.

7. A low speckle noise monolithic microchip laser as of claim 1 or claim 2 or claim 3, wherein:

one fundamental beam is generated by an active region of a Nd:YAG gain medium end-pumped by a pump light at 808 nm, the optical cavity is resonated at 1319 nm with polarization parallel to the principal plane of the birefringent crystal, oscillation of the stimulated emission with polarization normal to the principal plane of the birefringent crystal is suppressed by the birefringence, and at least one cavity mirror is coated transmissive to 1064 nm to suppress the unwanted oscillation;

another fundamental beam is generated by another active region of the Nd:YAG gain medium end-pumped by a pump light at 808 nm, the optical cavity is resonated at 1319 nm with polarization normal to the principal plane of the birefringent crystal, oscillation of the stimulated emission with polarization parallel to the principal plane of the birefringent crystal is suppressed by the birefringence, and at least one cavity mirror is coated transmissive to 1064 nm to suppress the unwanted oscillation;

wherein:

said birefringent crystal is TiO$_2$ or un-doped YVO$_4$ or other crystal in which the refractive indexes for the e-ray and o-ray are substantially different:

said nonlinear crystal is KTP;

the exterior surface of the nonlinear crystal is coated highly transmissive to 659 nm.

8. A low speckle noise monolithic microchip laser as of claim 3, wherein:

one fundamental beam is generated by an a-cut Nd:YVO$_4$ end-pumped by a pump light at 808 nm with π polarization, the C-axis of the gain medium is parallel to the principal plane of the birefringent crystal, and the optical cavity is resonated at 1064 nm;

another fundamental beam is generated by a diode laser that emits light around 1530 nm, the diode laser is controlled by an RF modulated drive current;

wherein:

said birefringent crystal is TiO$_2$ or un-doped YVQ$_4$;

said nonlinear crystal is KTP;

the exterior surface of the nonlinear crystal is coated highly transmissive to 628 nm.

* * * * *